(12) United States Patent
Yamamoto et al.

(10) Patent No.: US 7,284,908 B2
(45) Date of Patent: Oct. 23, 2007

(54) HYDRODYNAMIC BEARING DEVICE AND MOTOR

(75) Inventors: Takeyoshi Yamamoto, Niihama (JP); Yoshihiro Ashizaki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 235 days.

(21) Appl. No.: 11/217,318

(22) Filed: Sep. 2, 2005

(65) Prior Publication Data
US 2006/0056750 A1 Mar. 16, 2006

(30) Foreign Application Priority Data
Sep. 10, 2004 (JP) .............................. 2004-264249

(51) Int. Cl.
*F16C 32/06* (2006.01)
(52) U.S. Cl. ...................... 384/100; 384/107; 384/913
(58) Field of Classification Search ................ 384/100, 384/107, 912, 913
See application file for complete search history.

(56) References Cited

U.S. PATENT DOCUMENTS 6,341,896 B1    1/2002   Miura et al.

2004/0090701 A1    5/2004   Byun et al.
2004/0101217 A1*   5/2004   Kinoshita et al. ........... 384/100
2005/0169561 A1*   8/2005   Asada et al. ................. 384/107

FOREIGN PATENT DOCUMENTS

| JP | 10-89345 | 4/1998 |
| JP | 3052540 | 6/2000 |
| JP | 2000-297813 | 10/2000 |
| JP | 2004-166497 | 6/2004 |

* cited by examiner

*Primary Examiner*—Thomas R. Hannon
(74) *Attorney, Agent, or Firm*—Wenderoth, Lind & Ponack, L.L.P.

(57) ABSTRACT

An object of the present invention to provide a hydrodynamic bearing device and a motor having a high performance and reliability which prevents deterioration in a temperature property due to a difference in coefficients of linear expansion of a sleeve and a shaft and prevents abrasion of bearing surfaces of both the sleeve and the shaft. The sleeve is formed of a copper metal material or an iron metal material and is treated with electroless nickel plating at least on the surface which opposes the shaft. The shaft includes 0.2% by weight C, 0.3% by weight Si, 8% by weight Mn, 0.2% by weight S, 2.5% by weight Ni, and 14% by weight Cr, and a main component of the shaft is a manganese alloy steel including Fe.

14 Claims, 6 Drawing Sheets

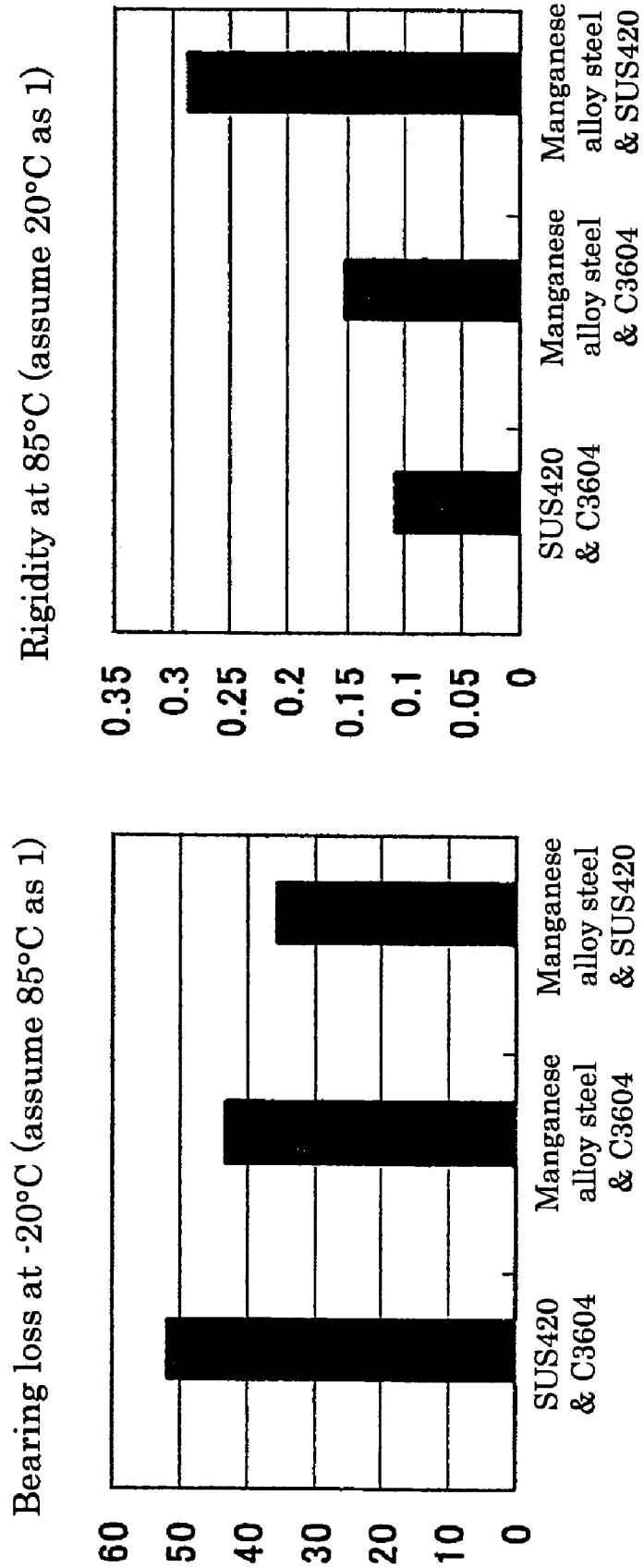

HYDRODYNAMIC BEARING DEVICE AND MOTOR

BACKGROUND OF THE INVENTION

1. Field of the Invention

The present invention relates to a hydrodynamic bearing device employing a hydrodynamic bearing and a motor including such a hydrodynamic bearing device.

2. Description of the Related Art

More and more hydrodynamic bearing devices are replacing ball bearing devices which have been conventionally used in spindle motors in hard discs, polygon mirrors, optical disc apparatuses and the like. The hydrodynamic bearing devices are superior to the ball bearings in a rotational accuracy and silent property.

More and more hard discs and the like which employ such hydrodynamic bearing devices are being used in mobile computing devices such as portable computers. Thus, hydrodynamic bearing devices have to have a high reliability over a wide range of an operating temperature. In the hydrodynamic bearing devices used in such devices, lubricating oil used in bearings has a property that its viscosity varies depending upon the temperature. This leads to a drawback in a temperature property. Specifically, a current consumption becomes large as the viscosity of the lubricating oil is increased at a low temperature, and a rigidity of the lubricating oil is reduced as the viscosity of the lubricating oil is decreased at a high temperature. In order to improve such a temperature property, a method to equalize bearing clearances at a high temperature and a low temperature is used.

For equalizing bearing clearances at a high temperature and a low temperature, for example, a coefficient of linear expansion of a shaft material has to be equal to that of a sleeve material in a shaft in a hydrodynamic bearing device and a sleeve which supports the shaft so as to be rotatable. Therefore, it has been considered that, when the sleeve is formed using a copper metal material having a large coefficient of linear expansion, an austenite stainless steel such as SUS303, which has a coefficient of linear expansion larger than those of martensite stainless steels such as SUS420J2, SUS440C, and the like which have been conventionally used for a shaft, is used. However, when the shaft is formed of an austenite stainless steel and is used, abrasion of a bearing surface is accelerated since its surface hardness is small compared to those of martensite stainless steels which are usually used. Abrasion of the bearing surface may result in an abnormal rotation, or even in a locked state of the bearing in which a rotation of the shaft stops at worst. Therefore, when an austenite stainless steel is used for a shaft as it is, there is a problem that the reliability of the bearing device deteriorates significantly.

In order to solve this problem, Japanese Laid-Open Publication No. 10-089345 discloses a hydrodynamic bearing device in which a shaft member formed of an austenite stainless steel is treated with nitriding for improving its surface hardness. For example, one of austenite stainless steels, SUS303, is formed into a desired shape by a cutting process, and a dynamic pressure groove is formed by plastic working. Then, a finishing process is performed by polishing. Further, a surface hardening process is performed by nitriding such as: 1) salt bath nitriding; 2) ion nitriding; 3) gas nitrocarburizing; and the like to obtain the shaft.

Japanese Laid-Open Publication No. 2000-297813 discloses a hydrodynamic bearing device in which a cold working rate for a bearing member formed of an austenite stainless steel is 20% or higher, thereby providing a surface hardness of 300 Hv or higher. For example, a steel ingot is processed with hot rolling (bar and wire-rod rolling). Then, cold working with a cold working rate (reduction of area) of 20% or higher by cold rolling or cold drawing. The obtained austenite stainless steel having the surface hardness of 300 Hv or higher is used to form the shaft.

However, the conventional hydrodynamic bearing device disclosed in Japanese Laid-Open Publication No. 10-089345 suffers from a surface roughness due to nitriding. When the stainless is used as it is after nitriding, there are problems such as contamination due to insufficient cleaning or acceleration of abrasion of the bearing surface. If the surface is polished again after nitriding, the surface roughness may be alleviated. However, this method requires an additional process step, and results in an increase in costs.

The conventional hydrodynamic bearing device disclosed in Japanese Laid-Open Publication No. 2000-297813 has the problem that a variance in performance such as hardness is large since the cold working rate is raised to 20% or higher in order to improve the hardness. Thus, it is difficult to secure a certain performance. This causes that the hardness and constitution vary depending upon the site to be cut. Thus, a machinable property deteriorates, and thus, a working accuracy deteriorates.

In the conventional hydrodynamic bearing devices disclosed in Japanese Laid-Open Publication Nos. 10-089345 and 2000-297813, the hardness of the surfaces of the shafts are improved. Thus, it is possible to prevent abrasion of the shafts. However, since copper metal materials having small hardness are used for the sleeves which hold the shafts so as to be rotatable, there is a problem that the sleeves are worn away. Since copper contained in the copper metal materials has a function to accelerate deterioration of lubricating oil which is a working fluid used in hydrodynamic bearings, the reliability of the hydrodynamic bearing device deteriorates.

In order to solve the above-described problems in the conventional hydrodynamic bearing devices, the present invention provides a hydrodynamic bearing device having a high performance and reliability which prevents deterioration in a temperature property due to a difference in coefficients of linear expansions of a sleeve and a shaft, and prevents abrasion of bearing surfaces of both the sleeve and the shaft, and a motor including such a hydrodynamic bearing device.

SUMMARY OF THE INVENTION

In order to achieve the above-described object, a hydrodynamic bearing device according to the present invention, as described in claim 1, comprises: a shaft; a sleeve having an insertion hole into which the shaft is to be inserted, in which an inner peripheral surface of the insertion hole is spaced apart from an outer peripheral surface of the shaft by a small gap; and a working fluid held between the shaft and the sleeve, wherein a dynamic pressure generating groove is formed on at least one of surfaces of the shaft and the sleeve which oppose each other, the shaft includes 0.2% by weight C, 0.3% by weight Si, 8% by weight Mn, 0.2% by weight S, 2.5% by weight Ni, and 14% by weight Cr, and a main component of the shaft is a manganese alloy steel including Fe.

In the hydrodynamic bearing device according to the present invention which has the above-described structure, the shaft is formed of the manganese alloy steel. Thus, abrasion of a bearing surface of the shaft can be suppressed, and the bearing with a high reliability is obtained.

A hydrodynamic bearing device according to the present invention, as described in claim 2, comprises: a shaft; a sleeve having an insertion hole into which the shaft is to be inserted, in which an inner peripheral surface of the insertion hole is spaced apart from an outer peripheral surface of the shaft by a small gap; and a working fluid held between the shaft and the sleeve, wherein a dynamic pressure generating groove is formed on at least one of surfaces of the shaft and the sleeve which oppose each other, the sleeve is formed of a copper metal material and is treated with electroless nickel plating at least on the surface which opposes the shaft, the shaft includes 0.2% by weight C, 0.3% by weight Si, 8% by weight Mn, 0.2% by weight S, 2.5% by weight Ni, and 14% by weight Cr, and a main component of the shaft is a manganese alloy steel including Fe.

In the hydrodynamic bearing device according to the present invention which has the above-described structure, the copper metal material is used for the sleeve, and the manganese alloy steel having a coefficient of linear expansion equal to those of the copper metal materials or steels is used for the shaft. Thus, a superior temperature property is achieved.

A hydrodynamic bearing device according to the present invention, as described in claim 3, comprises: a shaft; a sleeve having an insertion hole into which the shaft is to be inserted, in which an inner peripheral surface of the insertion hole is spaced apart from an outer peripheral surface of the shaft by a small gap; and a working fluid held between the shaft and the sleeve, wherein a dynamic pressure generating groove is formed on at least one of surfaces of the shaft and the sleeve which oppose each other, the sleeve is formed of an iron metal material, the shaft includes 0.2% by weight C, 0.3% by weight Si, 8% by weight Mn, 0.2% by weight S, 2.5% by weight Ni, and 14% by weight Cr, and a main component of the shaft is a manganese alloy steel including Fe.

In the hydrodynamic bearing device according to the present invention which has the above-described structure, the sleeve is formed of the iron metal material, and a coefficient of linear expansion of the iron metal material is equal to or smaller than that of the manganese alloy steel of the shaft. Thus, a superior temperature property is achieved. In the hydrodynamic bearing device according to the present invention which has the above-described structure, the iron metal material which has high hardness compared to that of copper metal materials is used for forming the sleeve. Thus, abrasion of the sleeve can be prevented, and deterioration of lubricating oil can be prevented.

A hydrodynamic bearing device according to the present invention, as described in claim 4, is a hydrodynamic bearing device according to claim 1 or 3, wherein the sleeve is treated with electroless nickel plating at least on a surface which opposes the shaft.

In the hydrodynamic bearing device according to the present invention which has the above-described structure, a surface hardness is increased and abrasion of the sleeve can be prevented since the sleeve is treated with electroless nickel plating. Further, since lubricating oil and copper do not contact each other, deterioration of the lubricating oil can be prevented.

A hydrodynamic bearing device according to the present invention, as described in claim 5, is a hydrodynamic bearing device according to any one of claims 1 to 4, wherein the manganese alloy steel has an austenite structure at least partially.

In the hydrodynamic bearing device according to the present invention which has the above-described structure, the manganese alloy steel has high hardness compared to austenite stainless steels. Thus, abrasion of the shaft can be prevented.

A hydrodynamic bearing device according to the present invention, as described in claim 6, is a hydrodynamic bearing device according to claim 5, wherein the shaft has a polished surface.

In the hydrodynamic bearing device according to the present invention which has the above-described structure, the surface of the shaft is cured. Thus, abrasion of the shaft can be prevented.

A motor according to the present invention comprises: a hydrodynamic bearing device according to any one of claims 1 to 6; and a driving portion which provides a rotational driving force in between a shaft and a sleeve of the hydrodynamic bearing device.

The motor according to the present invention which has the above-described structure includes a hydrodynamic bearing device according to any one of claims 1 to 6. Thus, a motor having a high performance and reliability which includes a hydrodynamic bearing device which can prevent deterioration in a temperature property due to a difference in coefficients of linear expansions of the sleeve and the shaft and can prevent abrasion of bearing surfaces of both the sleeve and the shaft can be achieved.

According to the present invention, there is provided a hydrodynamic bearing device and a motor having a high performance and reliability which prevent deterioration in a temperature property due to a difference in coefficients in linear expansion of a sleeve and a shaft and prevents abrasion of bearing surfaces of both the sleeve and the shaft.

In the hydrodynamic bearing device according the present invention, the sleeve may be formed by treating a copper metal material with electroless nickel plating with high hardness. Thus, abrasion of the sleeve can be suppressed. Further, a manganese alloy steel having high hardness and a high coefficient of linear expansion is used for the shaft. Thus, abrasion of the shaft can also be prevented. As a result, the processing cost can be reduced and the temperature property can be improved according to the present invention.

In the hydrodynamic bearing device according to the present invention, the sleeve may be formed by using an iron metal material which has high hardness compared to those of copper metals. Thus, abrasion of the sleeve can be suppressed. Further, the shaft is formed using a manganese alloy steel having high hardness. Thus, abrasion of the shaft can also be prevented.

BRIEF DESCRIPTION OF THE DRAWINGS

FIGS. 6A and 6B are graphs showing bearing losses and bearing rigidities of bearings formed by combining various materials used for the shaft and the sleeve in the conventional art and in Embodiment 2 of the present invention.

DESCRIPTION OF THE PREFERRED EMBODIMENTS

Hereinafter, a hydrodynamic bearing device and a spindle motor which is a motor including such a hydrodynamic bearing device according to the preferred embodiments of the present invention will be described with reference to the accompanying drawings.

EMBODIMENT 1

Figure 1:
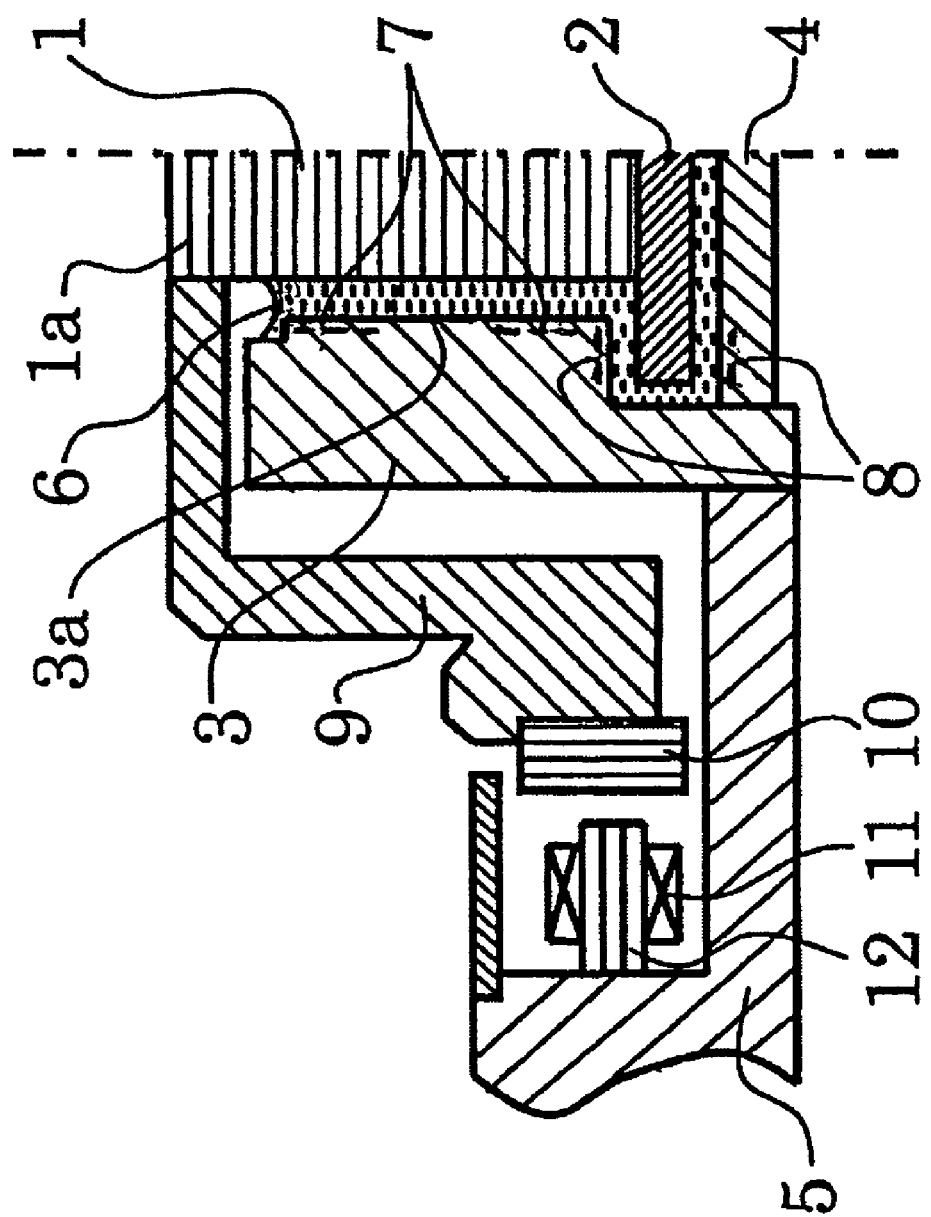
FIG. 1 is a cross-sectional view showing a bearing portion of a spindle motor of Embodiment 1 of the present invention.

FIG. 1 is a cross-sectional view showing a bearing portion of a spindle motor of Embodiment 1 of the present invention. FIG. 1 shows a structure of a left half of the spindle motor with respect to a center line is shown. The structure of the right half of the spindle motor is substantially the same as that of the left half. As shown in FIG. 1, a hydrodynamic bearing device in the spindle motor of Embodiment 1 includes a shaft 1; a thrust flange 2 which is fixed to an end portion (a lower end) of the shaft 1 and protrudes outward in a radial direction; a sleeve 3 into which the shaft 1 is inserted and which has an inner peripheral surface positioned against an outer peripheral surface of the shaft with a small gap interposed therebetween; and a thrust plate 4 positioned so as to face a lower end surface of the thrust flange 2 with a small gap interposed therebetween.

As shown in FIG. 1, the sleeve 3 is fixed to a base 5 of the spindle motor, and has an insertion hole 3a formed in a central portion. Into the insertion hole 3a, the shaft 1 is inserted with a small gap interposed therebetween. In the small gap between the shaft 1 and the sleeve 3, lubricating oil 6 is filled as a working fluid. The thrust flange 2 is integrally fixed to the lower end of the shaft 1 by, for example, screwing, fitting over, or the like. The thrust plate 4 is positioned so as to face a circular plate portion which is the lower end surface of the thrust flange 2 and fixed to the sleeve 3. The lubricating oil 6 is also filled in the gap between the thrust flange 2 and the thrust plate 4.

In the spindle motor of Embodiment 1, radial dynamic pressure generating grooves 7 having fishbone patterns are formed on the inner peripheral surface of the sleeve 3 by form rolling. In Embodiment 1, the radial dynamic pressure generating grooves 7 having fishbone patterns are formed on the inner peripheral surface of the sleeve 3 by form rolling. However, the present invention is not limited to this. For example, radial dynamic pressure generating grooves 7 having spiral patterns or fishbone patterns may be formed on the inner peripheral surface of the sleeve 3 or the outer peripheral surface of the shaft 1 by a conventional processing method such as form rolling, etching, electrolytic machining, and the like.

In Embodiment 1, the radial dynamic pressure generating grooves 7 are formed in two places. Two places are respectively in an upper portion and a lower portion of the inner peripheral surface of the insertion hole 3a of the sleeve 3 which opposes the shaft 1. The radial dynamic pressure generating grooves 7 are formed as described above on the inner peripheral surface of the sleeve 3 or the outer peripheral surface of the shaft 1 to form a radial bearing.

In Embodiment 1, thrust dynamic pressure generating grooves 8 which have fishbone pattern are formed on upper and lower surfaces which face the thrust flange 2 to form a thrust bearing. In the spindle motor of Embodiment 1 shown in FIG. 1, the thrust dynamic pressure generating grooves 8 are respectively formed on a lower surface of the sleeve 3 and an upper surface of the thrust plate 4 which face the thrust flange 2. However, the present invention is not limited to this. A thrust dynamic pressure generating groove 8 having a spiral pattern or a fishbone pattern may be formed on at least one of a lower surface of the thrust flange 2 and a surface of the thrust plate 4 which faces the lower surface of the thrust flange 2 to form a thrust bearing. Further, a thrust dynamic pressure generating groove 8 having a spiral pattern or a fishbone pattern may be formed on at least one of an upper surface of the thrust flange 2 and the lower surface of the sleeve 3 which faces the upper surface of the thrust flange 2 to form a thrust bearing.

The shaft 1 includes a protruding end 1a which protrudes upward from the opening of the sleeve 3. A hub 9 is fitted over an outer periphery of the protruding end 1a in a press-fit state. The hub 9 is a rotation member to which a magnetic recording disc or the like is fixed. In Embodiment 1, a rotor magnet 10 is attached to an outer peripheral portion of the hub 9 in a portion close to the base 5. To the base 5, a stator core 12 having a stator coil 11 wound thereto is attached so as to oppose the rotor magnet 10. The rotor magnet 10 and the stator core 12 form a driving portion of the spindle motor which provides a rotational driving force to the shaft 1.

When the hub 9, the shaft 1, and the thrust flange 2 are rotationally driven by the driving portion of the spindle motor, dynamic pressures are respectively generated in the lubricating oil 6 by the radial dynamic pressure generating grooves 7 in the radial direction and by the thrust dynamic pressure generating grooves 8 in the thrust direction. As a result, the shaft 1 and the thrust flange 2 can be rotatably supported without a contact with the sleeve 3 and the thrust plate 4 by small gaps maintained by hydrodynamic bearings, i.e., the radial direction bearing and the thrust direction bearing.

Next, the specific methods for producing the shaft 1 and the sleeve 3 in the spindle motor of Embodiment 1 will be described.

The sleeve 3 is formed of C3604, one of copper metal materials. Further, the inner peripheral surface of the sleeve 3 (the inner surface which forms the insertion hole 3a) is treated with electroless nickel plating at least in a portion which opposes the shaft 1. The shaft 1 is formed of a manganese alloy steel including 0.2% by weight C, 0.3% by weight Si, 8% by weight Mn, 0.2% by weight S, 2.5% by weight Ni, and 14% by weight Cr, and including Fe as a main component. The manganese alloy steel has austenite structure at least partially. The sleeve 3 may also be formed of BC6C, C3601, C3771 or the like. In the present invention, any type of material may be used as long as it is a copper metal material. The film thickness of the electroless nickel plating is preferably within the range of 0.5 to 20 μm, and more preferably, within the range of 0.5 to 5 μm.

Figures 2A, 2B:
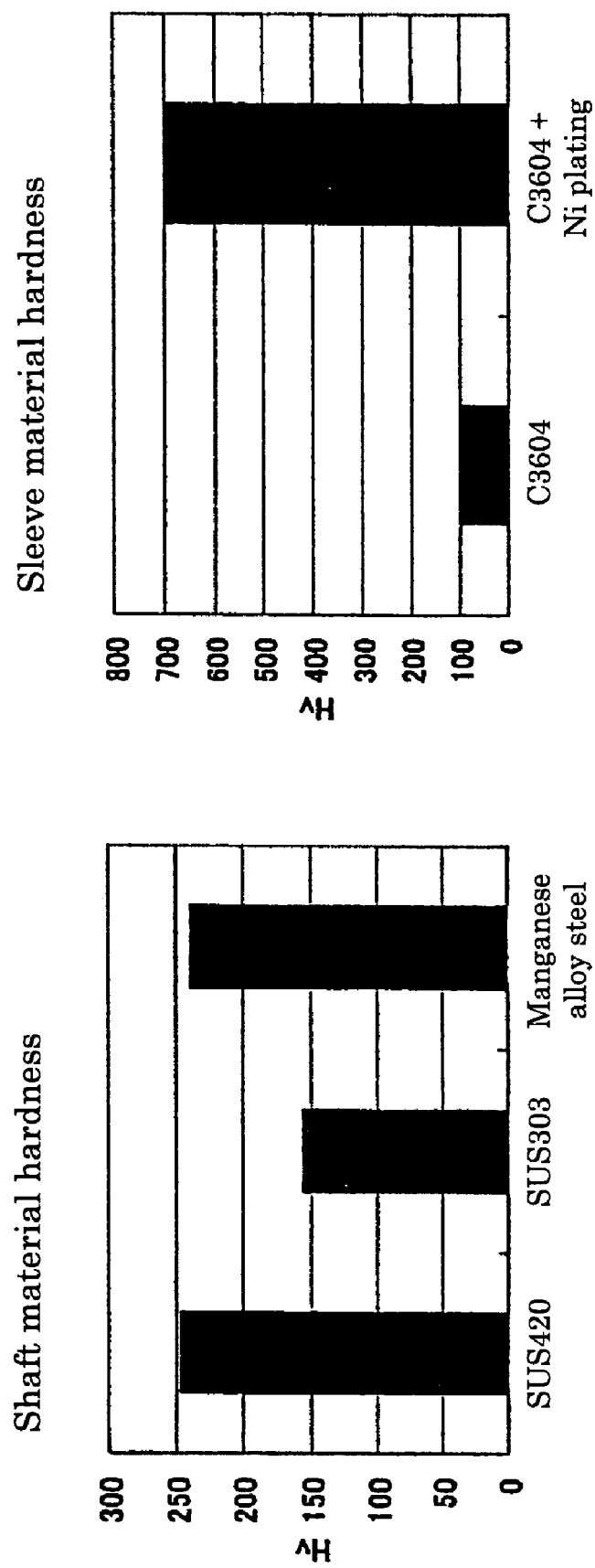
FIGS. 2A and 2B are graphs showing surface hardness [Hv] of various materials used for a shaft and a sleeve in the conventional art and in Embodiment 1 of the present invention.

FIGS. 2A and 2B show surface hardness of the materials used for the shaft and the sleeve. FIG. 2A shows surface hardness [Hv] of SUS420 and SUS303 used in the conventional shafts, and the manganese alloy steel used in the shaft 1 of Embodiment 1. FIG. 2B shows surface hardness [Hv] of C3604 used in the conventional sleeves, and the material obtained by treating C3604 with electroless nickel plating used in the sleeve 3 of Embodiment 1.

As shown in FIG. 2A, the manganese alloy steel used in the shaft 1 of Embodiment 1 has hardness almost equal to that of SUS420, which is a martensite stainless steel which has been used conventionally. The hardness is higher than that of the austenite stainless SUS303 which suffers from a problem of abrasion. Thus, deterioration in the reliability due to abrasion of the bearing surface of the shaft 1 can be prevented by using the manganese alloy steel as a material for the shaft 1.

The sleeve 3 of Embodiment 1 is formed by treating C3604 with electroless nickel plating, and has hardness higher than that of C3604 without plating. Thus, deterioration in the reliability due to abrasion of the bearing surface of the sleeve 3 can be prevented. Since the sleeve 3 of Embodiment 1 is treated with plating, the lubricating oil and copper do not contact each other. Thus, deterioration of the lubricating oil can be prevented.

In the present invention, by treating the surface of the shaft with a polishing process, hardness can be further improved by work hardening.

Figure 3B:
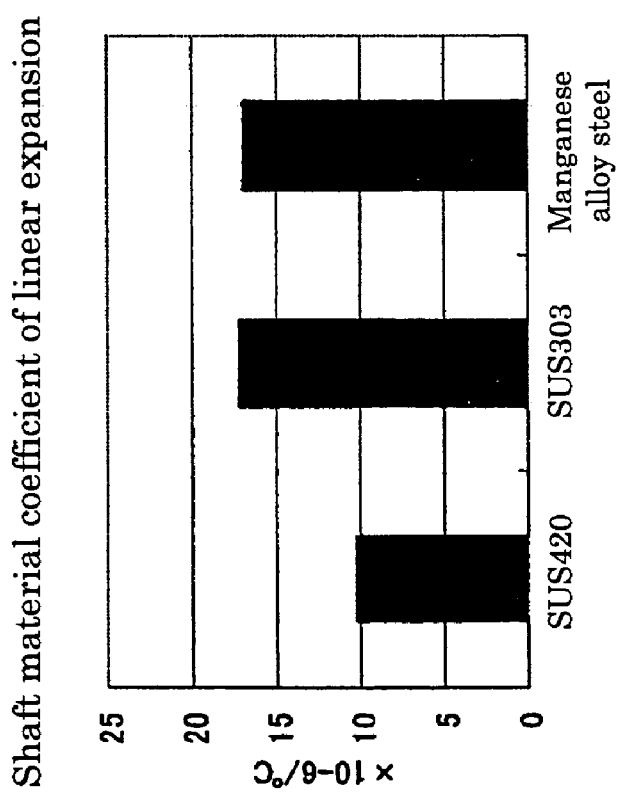
FIGS. 3A and 3B are graphs showing coefficients of linear expansions [$\times 10^{-6}$/° C.] of various materials used for the shaft and the sleeve in the conventional art and in Embodiment 1 of the present invention.
Figure 3A:
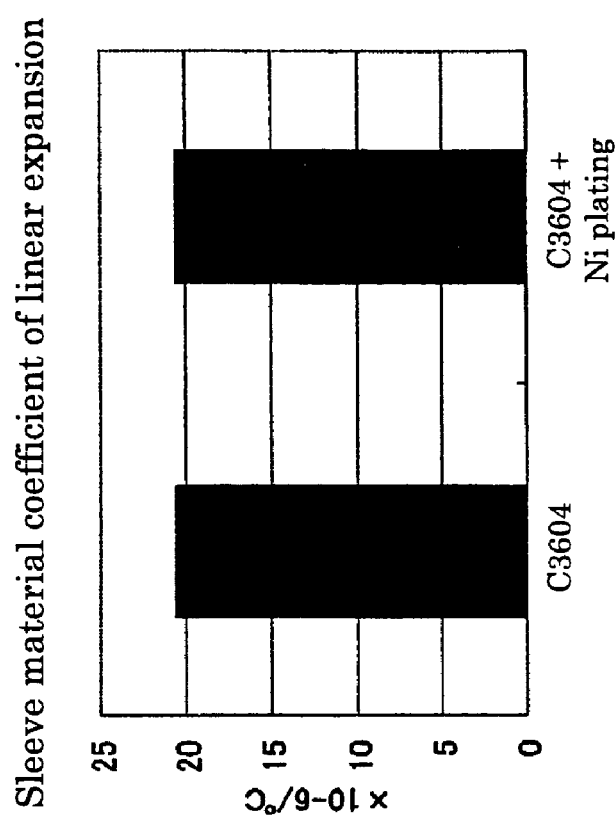

FIGS. 3A and 3B show coefficients of linear expansions of the materials used for the shaft and the sleeve. FIG. 3A shows coefficients of linear expansions [$\times 10^{-6}/°$ C.] of SUS420, SUS303 and the manganese alloy steel used as materials for the shaft. FIG. 3B shows coefficients of linear expansions [$\times 10^{-6}/°$ C.] of C3604, and the material obtained by treating C3604 with nickel plating used as materials for the sleeve.

As shown in FIG. 3A, the coefficient of the linear expansion of the manganese alloy steel used for the shaft 1 in Embodiment 1 is larger than that of SUS420, and almost equal to that of SUS303. In the sleeve 3 of Embodiment 1, there is no substantial change in the coefficient of linear expansion of C3604 even after C3604 is treated with electroless nickel plating. Since the manganese alloy steel and C3604 have almost the same coefficients of linear expansions, a change in the bearing gaps due to a temperature change becomes small. In a conventional structure, a very precise work tolerance for the bearing surface has been set to allow for a reduction in a bearing gap. In contrast, in the structure of Embodiment 1 of the present invention, a precision of a work tolerance can be eased since the bearing gap is constant. In this way, the cost can be reduced.

Figure 4B:
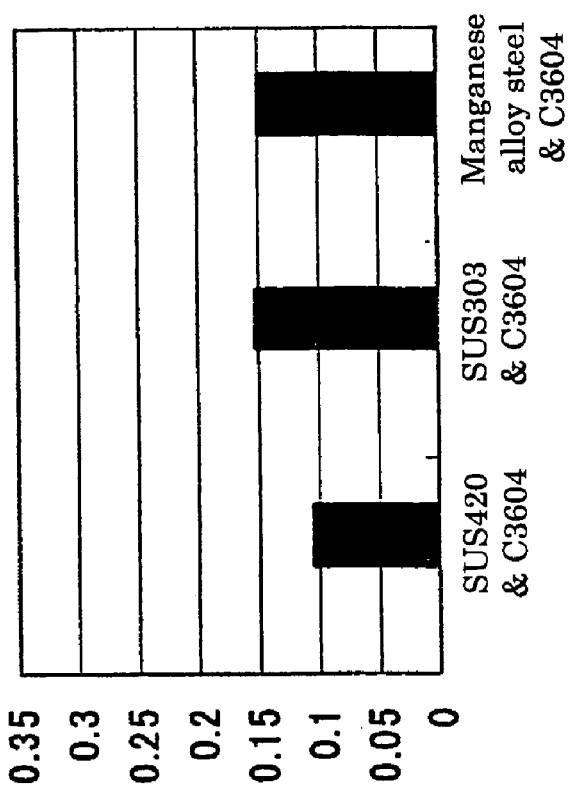
FIGS. 4A and 4B are graphs showing bearing losses and bearing rigidities of bearings formed by combining various materials used for the shaft and the sleeve in the conventional art and in Embodiment 1 of the present invention.
Figure 4A:
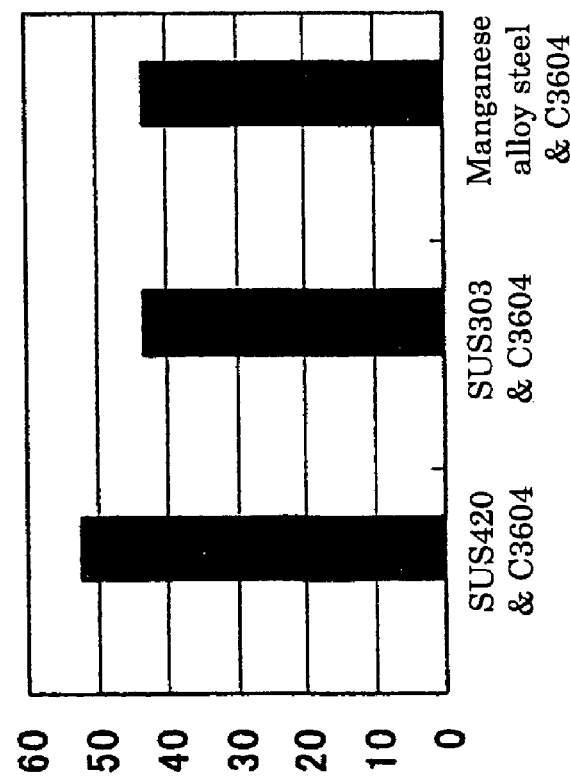

FIGS. 4A and 4B show bearing losses and bearing rigidities of the bearing formed by combining the above-mentioned materials. FIG. 4A shows the bearing losses at $-20°$ C. of the combinations of the shaft of SUS420 and the sleeve of C3604, the shaft of SUS303 and the sleeve of C3604, and the shaft of the manganese alloy steel and the sleeve of C3604. In FIG. 4A, $85°$ C. is assumed as 1. FIG. 4B shows the rigidities at $85°$ C. of the combinations of the shaft of SUS420 and the sleeve of C3604, the shaft of SUS303 and the sleeve of C3604, and the shaft of the manganese alloy steel and the sleeve of C3604. In FIG. 4B, $20°$ C. is assumed as 1.

As shown in FIG. 4A, the bearing formed by using SUS303 and the manganese alloy steel has the bearing loss at a low temperature smaller than that of the bearing using the conventional SUS420. Thus, a motor current can be reduced. Further, deterioration in the rigidity at a high temperature can be suppressed and reliability in a high temperature range can be improved. In this way, the combination of Embodiment 1 according to the present invention provides the motor with significantly effective properties as a motor used in mobile computing devices which are required to have a small current consumption in regard with the battery capacity and a reliability over a wide operating temperature range.

As described above, in the hydrodynamic bearing device according to Embodiment 1 of the present invention, the sleeve 3 is formed by treating a copper metal material with electroless nickel plating with high hardness. Thus, abrasion of the sleeve 3 can be suppressed. Further, a manganese alloy steel having high hardness and coefficient of linear expansion is used for the shaft 1. Thus, abrasion of the shaft 1 can be prevented. In this way, the processing cost can be reduced and the temperature property can be improved.

EMBODIMENT 2

Hereinafter, a spindle motor which is a motor including a hydrodynamic bearing device of Embodiment 2 according to the present invention will be described.

The spindle motor of Embodiment 2 has the same structure as the spindle motor of Embodiment 1 shown in FIG. 1. The spindle motor of Embodiment 2 is different from the spindle motor of Embodiment 1 on the point that the sleeve 3 is formed of a different material. Embodiment 2 will be described only on the point different from Embodiment 1.

In the spindle motor of Embodiment 2, the sleeve 3 is formed of SUS420, one of iron metal materials. The shaft 1 to be inserted into the sleeve 3 is formed of a manganese alloy steel including 0.2% by weight C, 0.3% by weight Si, 8% by weight Mn, 0.2% by weight S, 2.5% by weight Ni, and 14% by weight Cr and including Fe as a main component. The manganese alloy steel has an austenite structure at least partially. The sleeve 3 may also be formed of SUS430, SUS303, S45C and the like. Any type of material may be used as long as it is an iron metal material.

Further, at least a surface of the sleeve 3 which opposes the shaft 1 (an inner surface of the insertion hole 3a) is preferably treated with electroless nickel plating. The film thickness of the electroless nickel plating is preferably within the range of 0.5 to 20 μm, and more preferably, within the range of 0.5 to 5 μm.

Figure 5B:
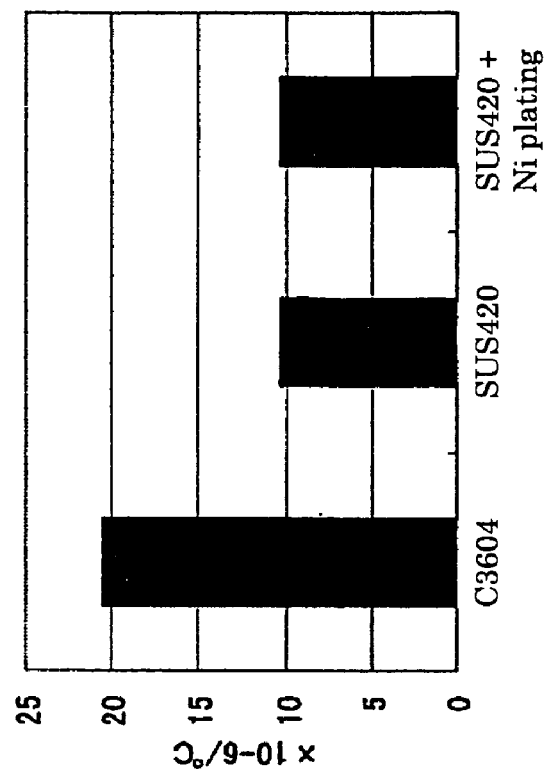
FIGS. 5A and 5B are graphs showing surface hardness [Hv] and coefficients of linear expansions [×10$^{-6}$/° C.] of various materials used for the shaft and the sleeve in the conventional art and in Embodiment 2 of the present invention.
Figure 5A:
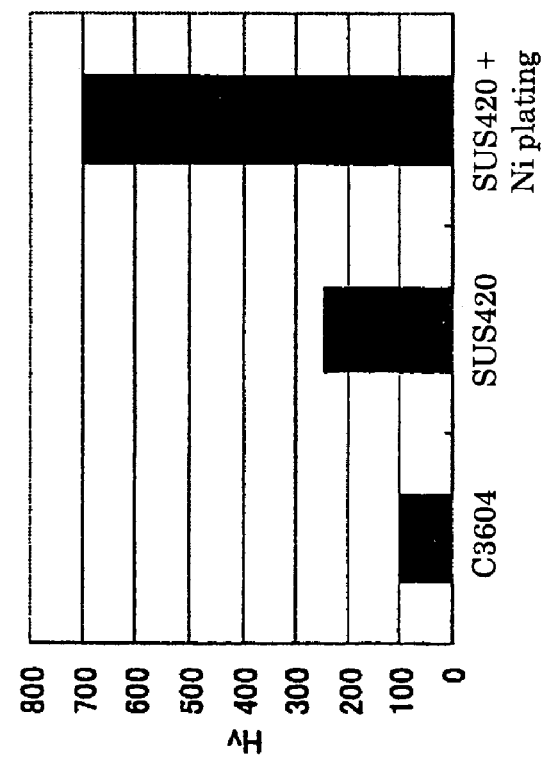

FIGS. 5A and 5B show surface hardness [Hv] (FIG. 5A) and coefficients of linear expansions [$\times 10^{-6}/°$ C.] (FIG. 5B) of C3604 used in the conventional sleeves, and SUS420 and the material obtained by treating SUS420 with electroless nickel plating used in the sleeve 3 of Embodiment 2 according to the present invention.

As shown in FIG. 5A, SUS420 which is an iron metal material used for the sleeve 3 has hardness higher than that of C3604 which is a copper metal material, and thus, deterioration in the reliability due to abrasion of the bearing surface of the sleeve 3 does not occur. Further, by treating the material with electroless nickel plating, the surface hardness can be further improved. Thus, the reliability of the hydrodynamic bearing device formed of the sleeve 3 using such a material can be further improved.

Since the hydrodynamic bearing device of Embodiment 2 does not employ a copper metal material, the lubricating oil and copper do not contact each other. Thus, deterioration of the lubricating oil can be prevented.

By treating the surface of the shaft with a polishing process, hardness can be further improved by work hardening. Thus, abrasion of the shaft can be reduced.

As shown in FIG. 5B, compared to C3604, SUS420 and the material obtained by treating SUS420 with electroless nickel plating have small coefficients of linear expansions. Thus, when SUS420 or the material obtained by treating SUS420 with electroless nickel plating is used as the material for the sleeve 3 and the above-mentioned manganese alloy steel is used as the material for the shaft 1, the bearing gap becomes large at a low temperature and becomes small at a high temperature. Specifically, the bearing gap expands at a low temperature at which the viscosity of the lubricating oil becomes large and the bearing gap becomes small at a high temperature at which the viscosity of the lubricating oil becomes small.

FIGS. 6A and 6B show bearing losses and bearing rigidities of the bearing formed by combining the materials conventionally used for the conventional sleeves and the shafts and the materials used in Embodiments 1 and 2.

FIG. 6A shows the bearing losses at −20° C. of the combinations of the shaft of SUS420 and the sleeve of C3604, the shaft of the manganese alloy steel and the sleeve of C3604, and the shaft of the manganese alloy steel and the sleeve of SUS420. In FIG. 6A, 85° C. is assumed as 1. FIG. 6B shows the rigidities at 85° C. of the combinations of the shaft of SUS420 and the sleeve of C3604, the shaft of the manganese alloy steel and the sleeve of C3604, and the shaft of the manganese alloy steel and the sleeve of SUS420. In FIG. 6B, 20° C. is assumed as 1.

As shown in FIG. 6A, in the structure of the hydrodynamic bearing device of Embodiment 2 in which the manganese alloy steel is used for the shaft 1 and SUS420 is used for the sleeve 3, the bearing loss at a low temperature becomes small, and a motor current can be reduced. Further, as shown in FIG. 6B, deterioration in the rigidity at a high temperature can also be suppressed and the reliability at a high temperature can be improved.

In this way, the spindle motor including the hydrodynamic bearing device of Embodiment 2 can provide a motor with significantly effective properties as a motor used in mobile computing devices which is required to have a small current consumption in regard with the battery capacity and the reliability over a wide operating temperature range.

As described above, in the hydrodynamic bearing device of Embodiment 2, the sleeve is formed of an iron metal material which has high hardness compared to copper metals. Thus, abrasion of the sleeve can be suppressed. Further, the shaft is formed using a manganese alloy steel having high hardness. Thus, abrasion of the shaft can also be prevented. Further, in the hydrodynamic bearing device of Embodiment 2, the sleeve is treated with nickel plating to further suppress abrasion of the shaft. Moreover, the iron metal material used for the sleeve in the hydrodynamic bearing device of the present invention has a coefficient of linear expansion equal to or smaller than that of the manganese alloy steel of the shaft. Thus, the temperature property of the bearing device can be improved.

In the above-described embodiment, the hydrodynamic bearing spindle motor of an inner rotor type with a rotating shaft has been described. However, the hydrodynamic bearing device of the present invention can be applied to various bearings and motor shapes having a fixed shaft, outer rotor type, or the like. Further, in the above embodiments, the hydrodynamic bearing devices which employ lubricating oil as a working fluid has been described. However, the present invention can also be applied to hydrodynamic bearing devices which employ air, or other types of gas as a working fluid.

The hydrodynamic bearing device of the present invention and the motor using such a hydrodynamic bearing device can be used for rotating equipment of HDDs, polygon mirrors, optical disc apparatuses, and the like.

Since the hydrodynamic bearing device of the present invention can prevent deterioration in a temperature property due to a difference in coefficients of linear expansions of a sleeve and a shaft, and can prevent abrasion of bearing surfaces of both the sleeve and the shaft, it is useful as a bearing in rotating equipment such as a motor.

What is claimed is:

1. A hydrodynamic bearing device comprising:
   a shaft;
   a sleeve having an insertion hole into which the shaft is to be inserted, in which an inner peripheral surface of the insertion hole is spaced apart from an outer peripheral surface of the shaft by a small gap; and
   a working fluid held between the shaft and the sleeve, wherein
   a dynamic pressure generating groove is formed on at least one of surfaces of the shaft and the sleeve which oppose each other,
   the shaft includes 0.2% by weight C, 0.3% by weight Si, 8% by weight Mn, 0.2% by weight S, 2.5% by weight Ni, and 14% by weight Cr, and
   a main component of the shaft is a manganese alloy steel including Fe.

2. A hydrodynamic bearing device according to claim 1, wherein the sleeve is treated with electroless nickel plating at least on a surface which opposes the shaft.

3. A hydrodynamic bearing device according to claim 1, wherein the manganese alloy steel has an austenite structure at least partially.

4. A hydrodynamic bearing device according to claim 3, wherein the shaft has a polished surface.

5. A motor comprising:
   a hydrodynamic bearing device according to claim 1; and
   a driving portion which provides a rotational driving force in between a shaft and a sleeve of the hydrodynamic bearing device.

6. A hydrodynamic bearing device comprising:
   a shaft;
   a sleeve having an insertion hole into which the shaft is to be inserted, in which an inner peripheral surface of the insertion hole is spaced apart from an outer peripheral surface of the shaft by a small gap; and
   a working fluid held between the shaft and the sleeve, wherein
   a dynamic pressure generating groove is formed on at least one of surfaces of the shaft and the sleeve which oppose each other,
   the sleeve is formed of a copper metal material and is treated with electroless nickel plating at least on the surface which opposes the shaft,
   the shaft includes 0.2% by weight C, 0.3% by weight Si, 8% by weight Mn, 0.2% by weight S, 2.5% by weight Ni, and 14% by weight Cr, and
   a main component of the shaft is a manganese alloy steel including Fe.

7. A hydrodynamic bearing device according to claim 4, wherein the manganese alloy steel has an austenite structure at least partially.

8. A hydrodynamic bearing device according to claim 7, wherein the shaft has a polished surface.

9. A motor comprising:
   a hydrodynamic bearing device according to claim 6; and
   a driving portion which provides a rotational driving force in between a shaft and a sleeve of the hydrodynamic bearing device.

10. A hydrodynamic bearing device comprising:
    a shaft;
    a sleeve having an insertion hole into which the shaft is to be inserted, in which an inner peripheral surface of the insertion hole is spaced apart from an outer peripheral surface of the shaft by a small gap; and a working fluid held between the shaft and the sleeve, wherein a dynamic pressure generating groove is formed on at least one of surfaces of the shaft and the sleeve which oppose each other, the sleeve is formed of an iron metal material, the shaft includes 0.2% by weight C, 0.3% by weight Si, 8% by weight Mn, 0.2% by weight S, 2.5% by weight Ni, and 14% by weight Cr, and a main component of the shaft is a manganese alloy steel including Fe.

11. A hydrodynamic bearing device according to claim 10, wherein the sleeve is treated with electroless nickel plating at least on a surface which opposes the shaft.

12. A hydrodynamic bearing device according to claim 10, wherein the manganese alloy steel has an austenite structure at least partially.

13. A hydrodynamic bearing device according to claim 12, wherein the shaft has a polished surface.

14. A motor comprising:

a hydrodynamic bearing device according to claim 10; and a driving portion which provides a rotational driving force in between a shaft and a sleeve of the hydrodynamic bearing device.

* * * * *